United States Patent [19]
Lee

[11] Patent Number: 5,249,217
[45] Date of Patent: Sep. 28, 1993

[54] BOTH WAY RECORDING METHOD OF A WIRELESS TELEPHONE

[75] Inventor: Suk G. Lee, Kyungki, Rep. of Korea

[73] Assignee: Goldstar Telecommunications Co., Ltd., Seoul, Rep. of Korea

[21] Appl. No.: 791,230

[22] Filed: Nov. 13, 1991

[30] Foreign Application Priority Data

Nov. 23, 1990 [KR] Rep. of Korea .................. 19159

[51] Int. Cl.⁵ .................. H04M 11/00; H04M 1/64
[52] U.S. Cl. .................. 379/58; 379/61; 379/67; 379/88
[58] Field of Search .................. 379/58, 59, 61, 67, 379/88

[56] References Cited

U.S. PATENT DOCUMENTS

| | | | |
|---|---|---|---|
| 4,500,752 | 2/1985 | Lee | 379/63 |
| 4,881,259 | 11/1989 | Scordato | 379/67 |
| 5,029,198 | 7/1991 | Walpole et al. | 379/88 |
| 5,044,010 | 8/1991 | Frenkiel et al. | 379/63 |
| 5,138,649 | 8/1992 | Krisbergh et al. | 379/58 |

Primary Examiner—Curtis Kuntz
Assistant Examiner—Vijay Shankar
Attorney, Agent, or Firm—Finnegan, Henderson, Farabow, Garrett & Dunner

[57] ABSTRACT

A wireless telephone has a mobile unit having a first computer and a base unit having a second computer and a recording device. Push button requests for starting and stopping recording by the base unit, and end of speech indications for stopping recording are processed by the first computer and transmitted as data signals to the second computer for implementation in the base unit. The second computer acknowledges recording starts to the first computer.

6 Claims, 8 Drawing Sheets

BOTH WAY RECORDING METHOD OF A WIRELESS TELEPHONE

BACKGROUND OF THE INVENTION

1. Technical Field

The present invention relates to a wireless telephone, and more particularly, the invention relates to a remote recording method and system for a wireless telephone having a stationary or base unit capable of recording speech of an opposite party by remote-control from a portable or remote unit of the telephone when there is a need to record during a telephone conversation.

2. Prior Art

Although a conventional wireless telephone has been able to record under remote unit actuation when a need arises to do so during a telephone conversation, it has not been possible to know the recording starting time point. In case of a need to stop recording intermediately, it has not been possible to stop the recording. With the use of additional hardware configurations to execute such start and stop recording functions, there have been problems that the circuit configuration becomes complicated an costly. Moreover, with the use of pure hardware, the size of a portable unit and a stationary unit is increased.

OBJECTS AND SUMMARY OF THE INVENTION

Accordingly, the present invention has been made to solve the above-described prior art problems, and it is an object of the present invention to provide a remote recording method for a wireless telephone having a base unit capable of recording the speech of an opposite party by remote-control from a portable unit when there is a need to record during us of the wireless telephone.

In order to attain the above-described and other objects, the method of the present invention for operating a wireless telephone having base and remote units comprises: a first step which judges whether a remote unit record key is inputted by an operating button during a telephone conversation and when the record key is inputted, transmitting a record starting data to the base unit to initiate the record starting; a second step which sets a base unit recording mode operation and flags data applied from the first process and applies the remote record starting data to a record starting process; a third step which judges whether a remote stopping key is inputted by a releasing button during a telephone conversation, and, when the record stopping key is inputted, transmitting a remote record stopping data to the base unit and resets a remote recording state flag; and a fourth step which reads out the data applied by said third process and judges whether it is a remote record stopping data, and, when it is such data, resetting a remote recording state flag.

The foregoing and other objects and advantages of the present invention will be classified by the following description with reference to the accompanying drawings.

BRIEF DESCRIPTION OF THE DRAWINGS

The accompanying drawings, which are incorporated in and constitute a part of this specification, illustrate a preferred embodiment of the invention and together with the description provide an explanation of the objects, advantages and principles of the invention. In the drawings.

DETAILED DESCRIPTION OF THE INVENTION

Figure 1:
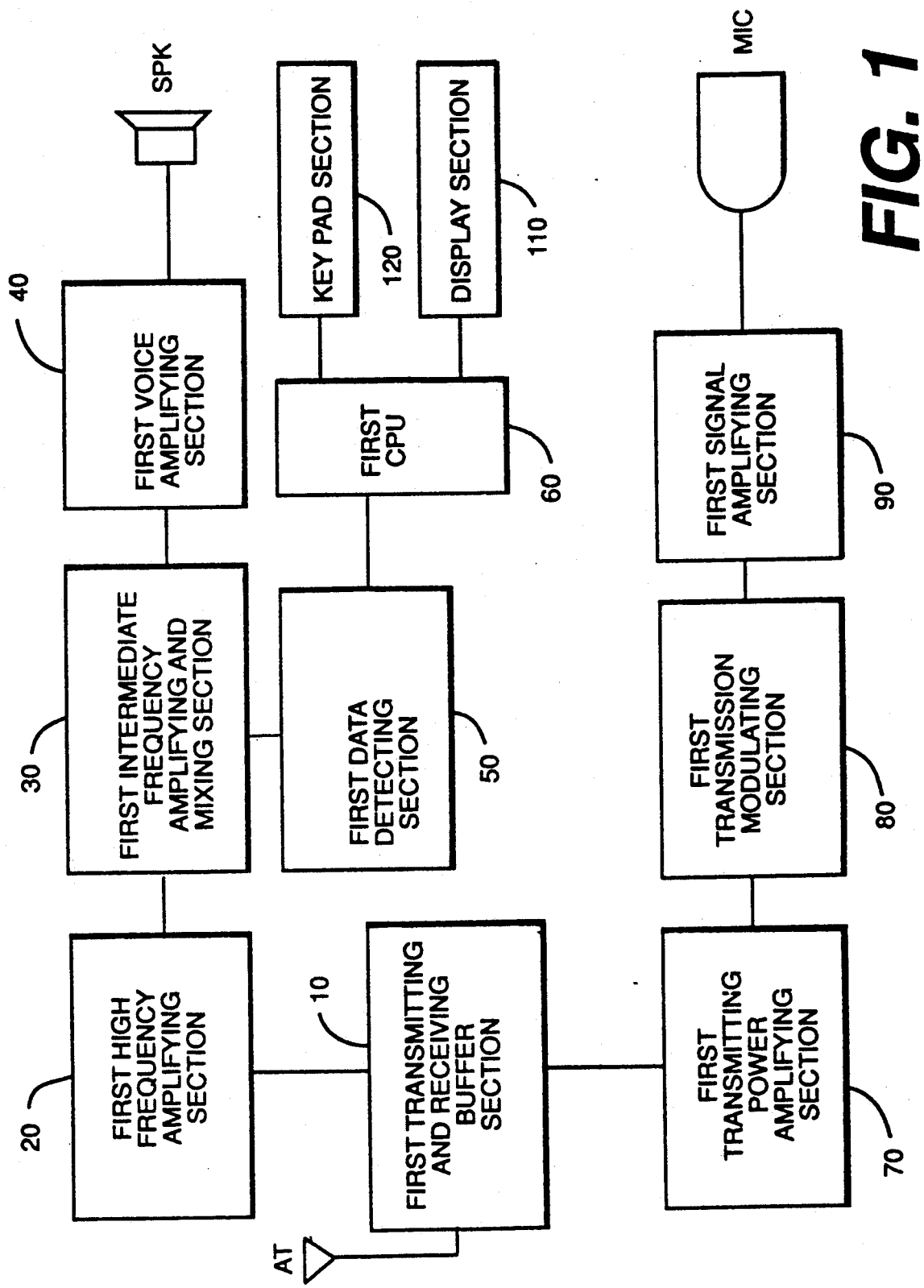
FIG. 1 is a block diagram of a portable unit of a wireless telephone according to the present invention.
Figure 2:
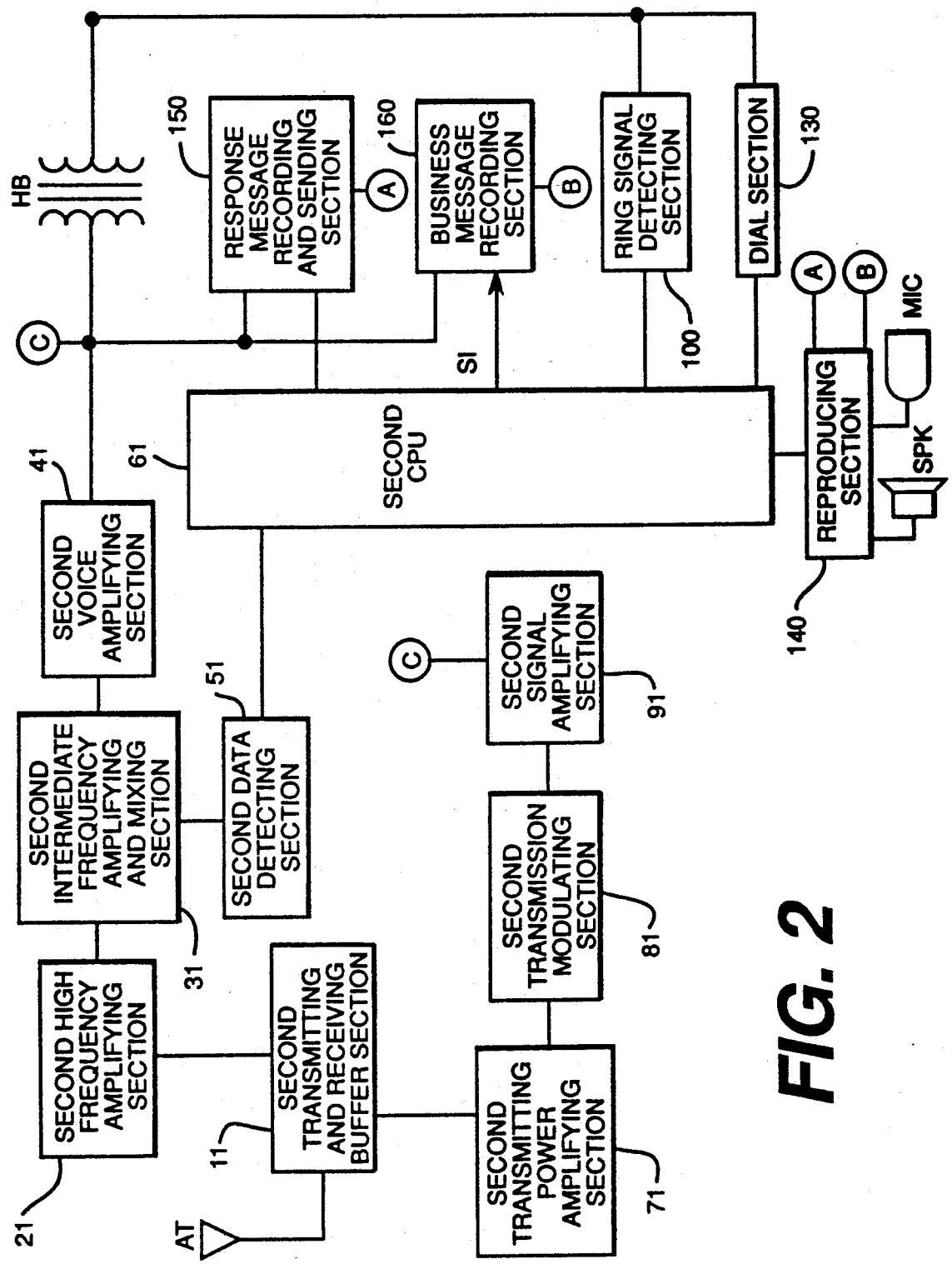
FIG. 2 is a block diagram of a stationary or base unit of a wireless telephone according to the present invention.

FIGS. 1 and 2 will be described together because their configuration and operation are partly the same. The portable unit and the base unit of a wireless telephone according to the present invention respectively comprise first and second transmitting and receiving buffer sections 10, 11 for separately transmitting and receiving high frequency signals. The mobile and base units further respectively comprise first and second high frequency amplifying sections 20, 21 for amplifying a received high frequency signal, first and second intermediate frequency amplifying and mixing sections 30, 31 which mix a local oscillation frequency and the high frequency of the first and second high frequency amplifying sections 20, 21 and detect the intermediate frequency signals.

First and second voice amplifying sections 40, 41 amplify detected voice signals from the intermediate frequency signals, and first and second data detecting sections 50, 51 detect the data signals from the intermediate frequency signals.

First and second CPUs 60, 61 control all of the described telephone functions. First and second transmitting power amplifying sections 70, 71 amplify the first and second transmitting high frequency signals, and first and second modulating sections 80, 81 modulate the transmitting signals of the first and second transmitting power amplifying sections 70, 71.

First and second signal amplifying sections 90, 91 amplify the transmitting signals of the first and second modulating sections 80, 81, and a ring signal detecting section 100 detects a ring signal applied to a telephone office line and gives status information to the second CPU 61.

A displaying section 110 is connected to the first CPU 60 and indicates the present operating state. A key pad section 120 defines the operation and function of the first CPU 60. A dial section 130 is connected to the second CPU 61 and executes dialing signals.

An antenna ATS transmits to and receives from the portable unit a high frequency signal. A hybrid HB connects a telephone office line and the wireless telephone by signal. A microphone Mic converts a voice signal to an electric signal, and a speaker SPK converts an electric signal to a voice signal.

A reproducing section 140 reproduces a response message and a business message. A response message recording and sending section 150 sends an answering message to an outside telephone under control of the second CPU 61. A business message recording section 160 records the speech of opposite party under control of the second CPU 61.

Figure 3:
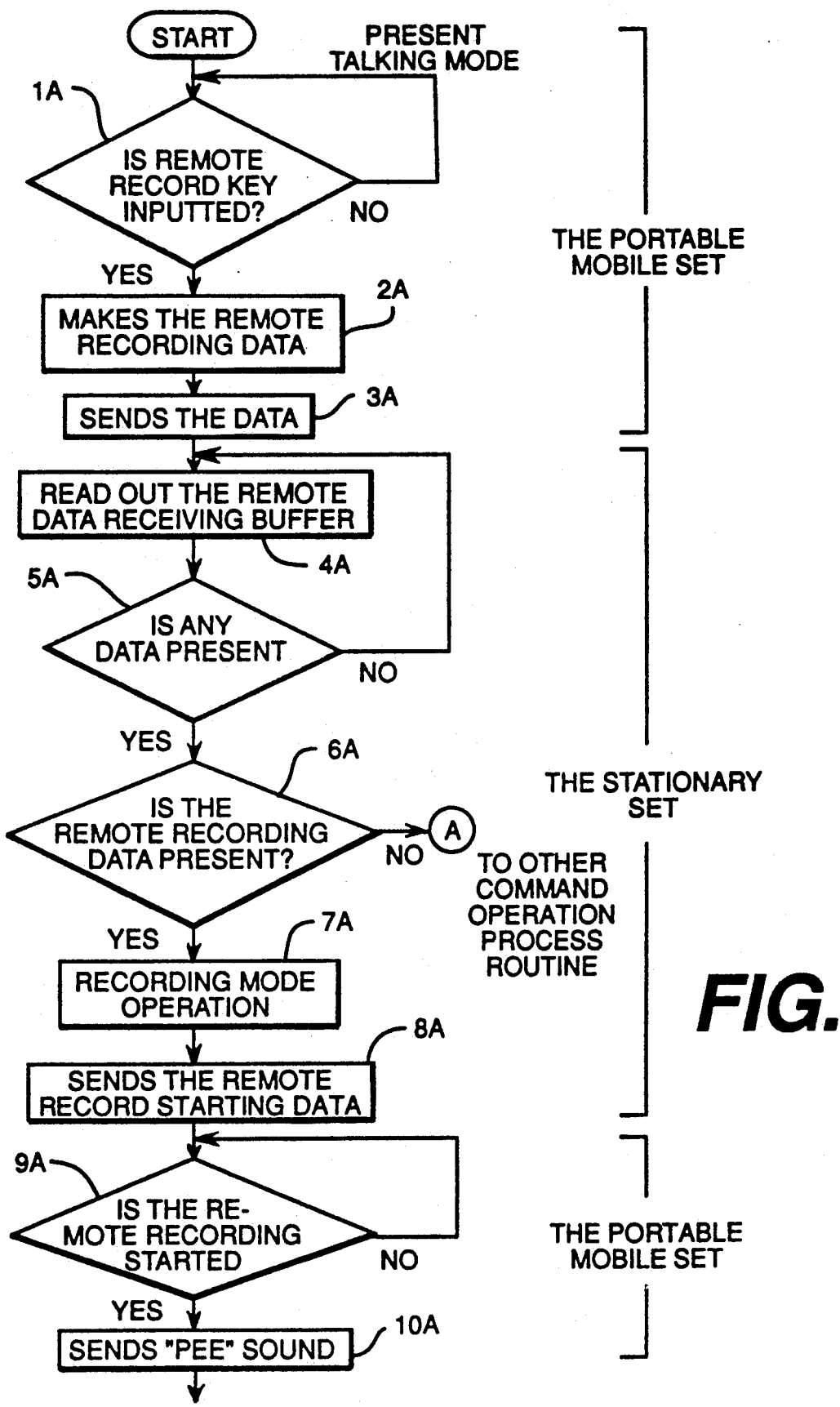
FIG. 3 is a flow chart explaining a starting of remote recording operation of stationary and portable units of a wireless telephone according to the present invention.
Figure 4:
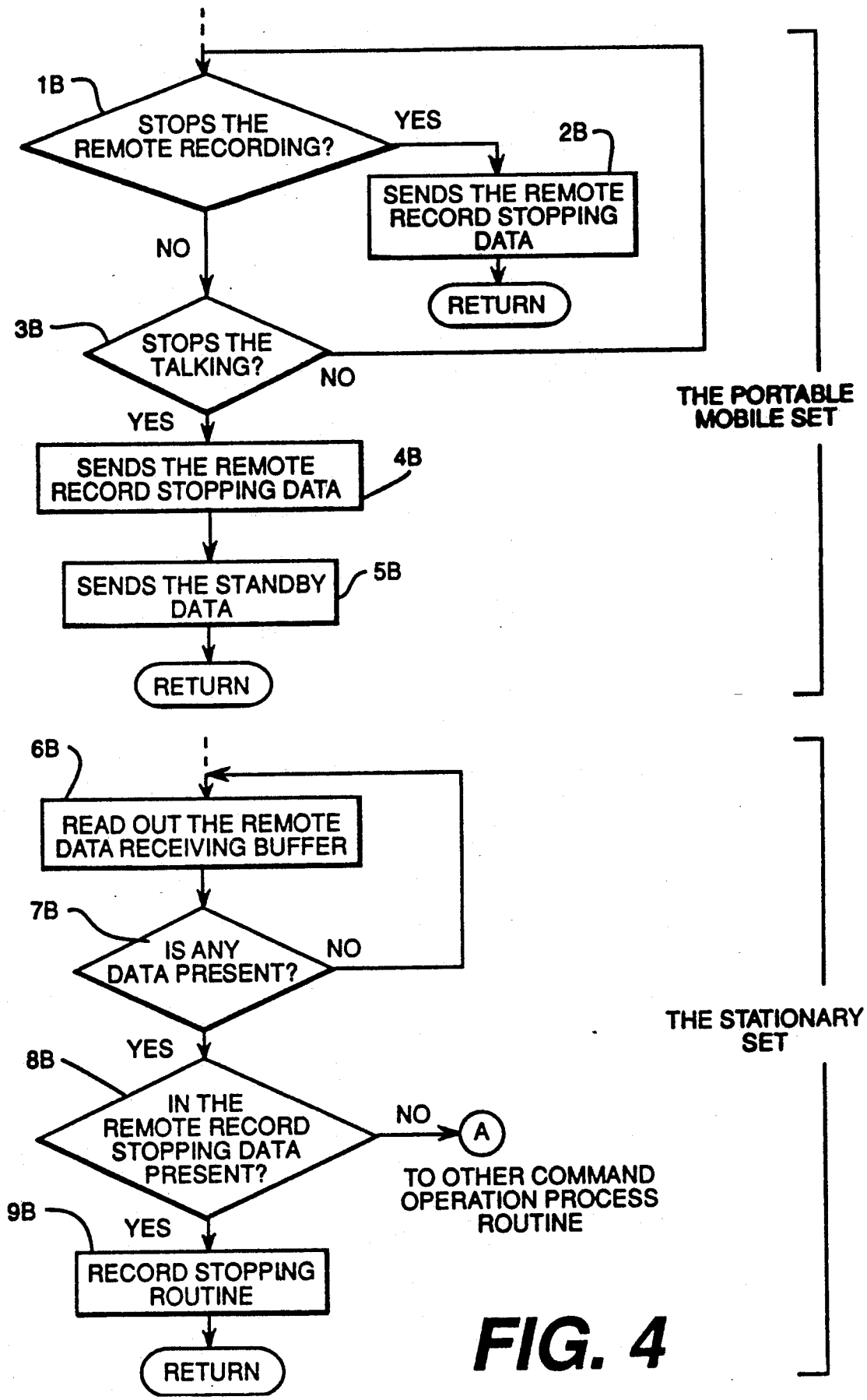
FIG. 4 is a flow chart explaining a stopping of remote recording operating during talking and, at speech ending, according to the present invention.

FIGS. 3 and 4 are flow charts that explain the starting and stopping of base and portable unit recording operations during talking and a stopping of recording operation at the end of a conversation according to the present invention.

Figure 5:
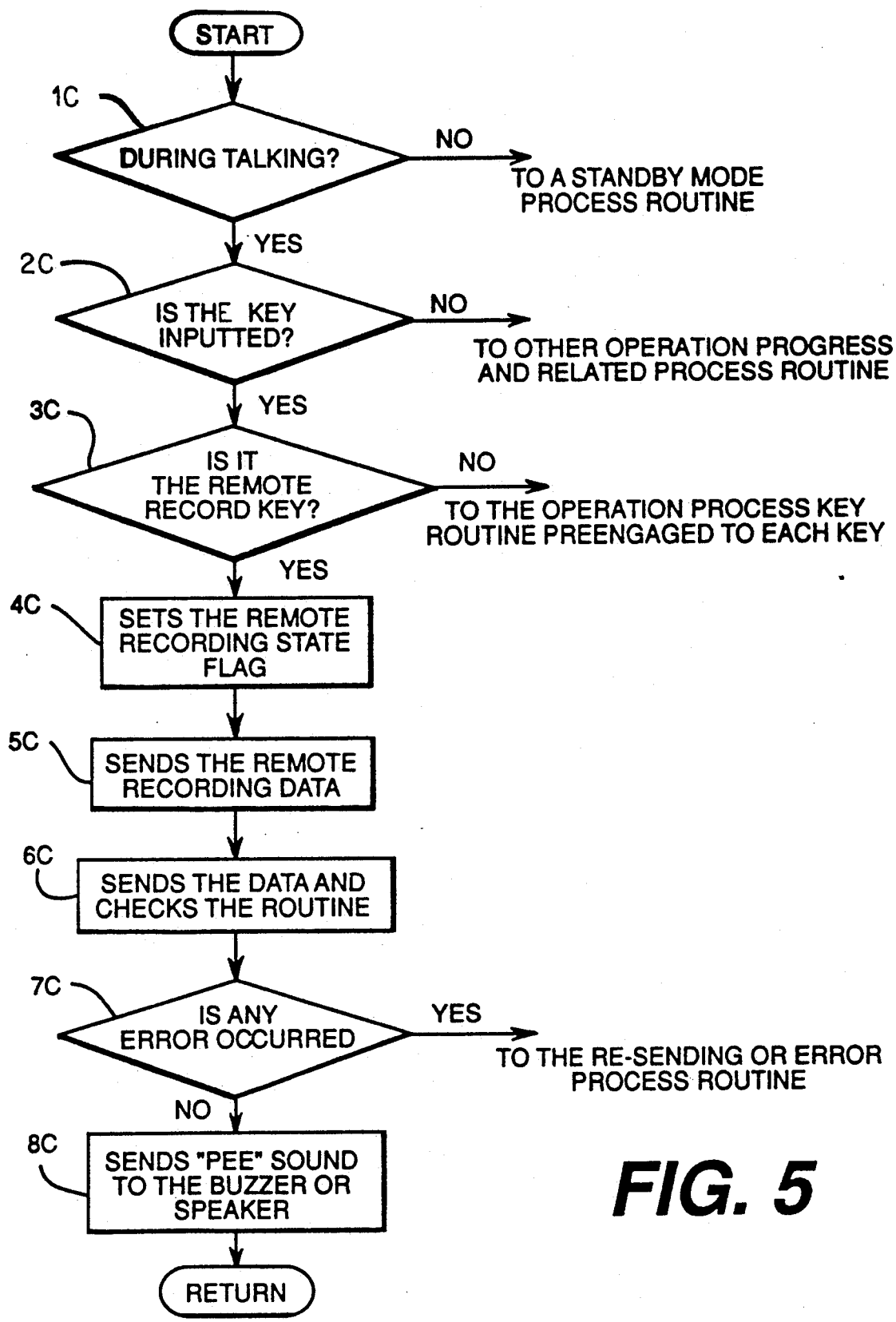
FIG. 5 is a flow chart of a remote control record starting process of the portable unit according to the present invention.
Figure 6:
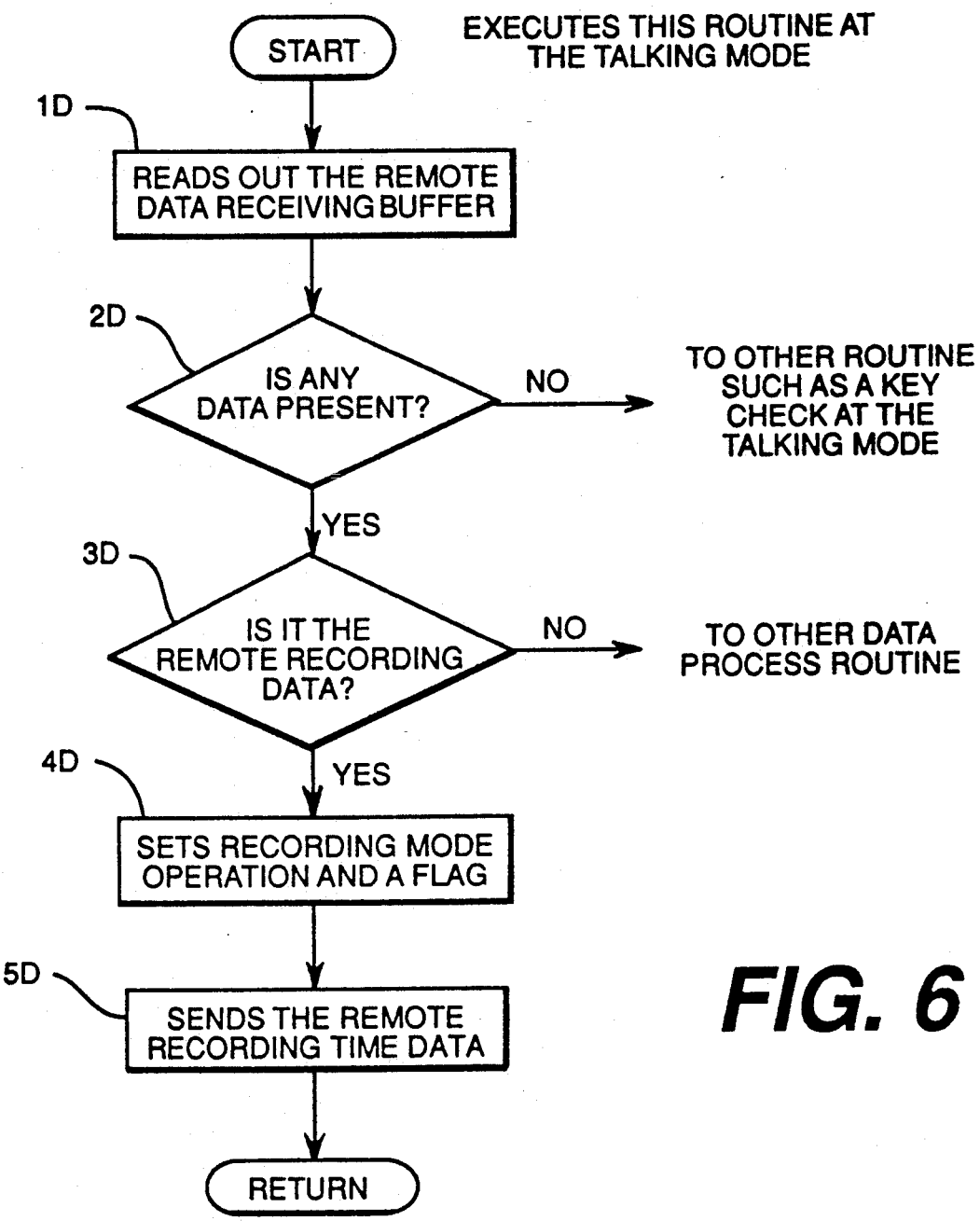
FIG. 6 is a flow chart of a remote control record starting process of the stationary unit according to the present invention.

FIGS. 5 and 6 are flow charts of a remote control record starting process for the portable and stationary units according to the present invention.

Figure 7:
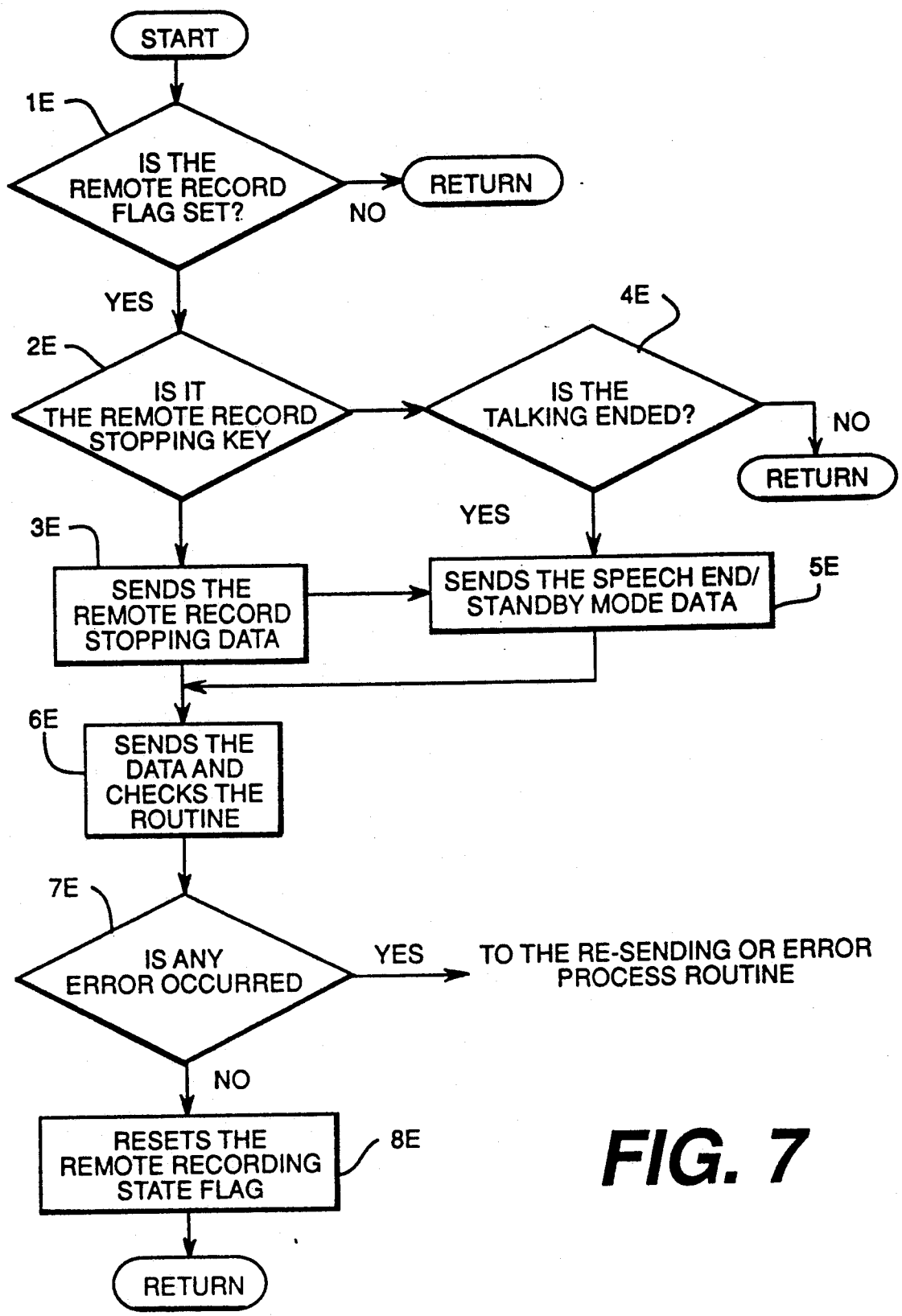
FIG. 7 is a flow chart of a remote control record stopping process of the portable unit according to the present invention.
Figure 8:
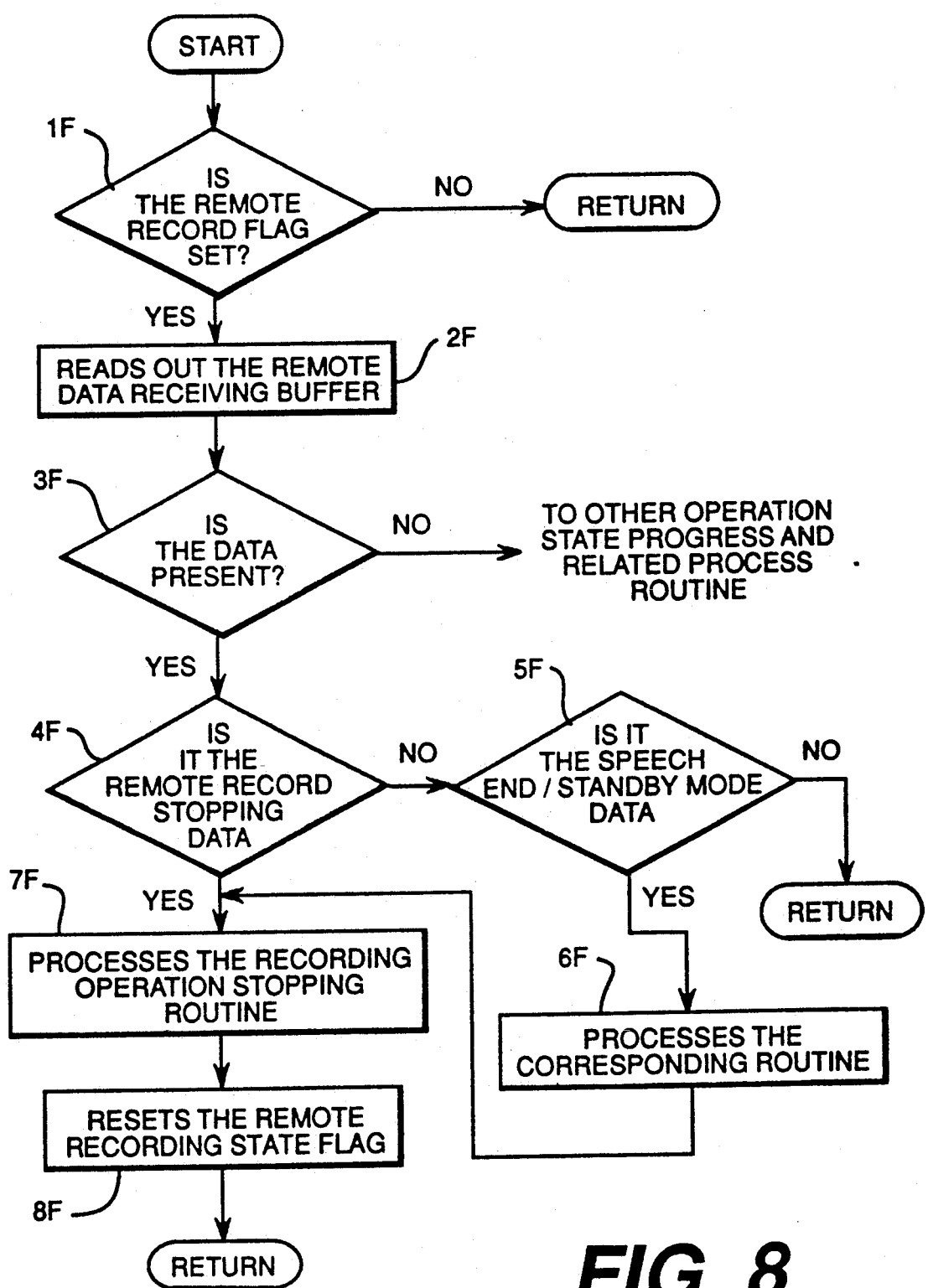
FIG. 8 is a flow chart of a remote control record stopping process of the stationary unit according to the present invention.

FIGS. 7 and 8 are flow charts of a remote control record stopping process of the portable and the stationary units according to the present invention. Operation of the invention will be described herein in detail on the basis of above-described configuration.

First, the wireless telephone is a device which executes mutual talking by utilizing a radio signal between the portable unit and the stationary or base unit. In the case when a matter to be recorded occurs when a user is using the portable unit and talking with someone through a telephone system connection, when the user presses an operation button (a "both way" record button) of the portable unit, the first CPU 60 of the portable unit senses the button operation and judges whether it is a remote record key at step 1A. When it is not the remote record key, the step 1A executes again, and when it is the remote record key, a step 2A is next executed.

At the step 2A, the record starting data is high frequency modulated by the first transmitting modulation section 80, and the signal is amplified by the first transmitting power amplifying section 70. Thereafter, at step 3A, the data is coupled through the first transmitting and receiving buffer section 10 for transmission to the base unit via the antenna ATM.

The base or stationary unit receives the high frequency signal containing the data via the antenna ATS and executes a step 4A. At the step 4A, the modulated signal is separated from the transmitting frequency by the second transmitting and receiving buffer section 11 and then amplified by the second high frequency amplifying section 21. Thereafter, the amplified signal is mixed with a local oscillation frequency by the second intermediate frequency amplifying and mixing section 31, an intermediate frequency signal is detected, and the data signal is separated by the second data detecting section 51.

The second CPU 61 of the stationary set receives the data signal and judges whether there is data as at step 5A and, if so, executes a step 6A.

At the step 6A, a judgment is made as to whether there is a remote record data. When there is none, the step 6A directs the process to another commanding operation process routine A. When there is a remote record data, step 6A executes a business message recording function, that is, applies a first control signal S1 from the second CPU 61 to the business message recording section 160 and connects a present speech circuit (path) for recording. Accordingly, at step 7A, the section 160 operates in a recording mode, and at step 8A, the second CPU 61 sends a remote record starting data acknowledgment that the recording operation has been started.

The sending data acknowledgment is modulated by high frequency by the second transmission modulating section 81 and then emitted by the antenna ATS through the second transmitting power amplifying section 71 and the second transmitting and receiving buffer section 11. Thereafter, the acknowledgment is received via the antenna ATM of the portable unit and passed through the first transmitting and receiving buffer section 10 and amplified by the first high frequency amplifying section 20. The amplified signal is applied through the first intermediate frequency amplifying and mixing section 30 to the first data detecting section 50, and the first CPU 60 detects whether the record starting data transmitted from the starting set obtained by the detecting operation is a remote record starting data acknowledgment at step 9A. At the step 9A, if it is not a remote record starting data acknowledgment, it executes the step 9A again, and, if it is a remote record starting data, a step 10A is next executed, and indicates the recording state with a short sound of "Pee" to the user.

In the case when it is desired to stop speech recording, upon pressing a releasing button (or else pressing again the "both way" operating button if it is a toggle device), the releasing data is transferred to the second CPU 61 of the stationary unit in the same manner as described for the operating data, the stationary unit stops the recording state, and reports the stopped state to the portable unit. Another method is to enter a state of stopping the recording when the portable unit is switched to a talking standby mode by the mutual talking stop.

In greater detail, as shown in FIG. 4, the first CPU 60 judges whether it is a remote record stopping key at step 1B and, when it is a record stopping key, sends the remote record stopping data at step 2B and transfers by the method described for the operating data and stops the recording. When it is not the remote record stopping key, it judges whether it is a talking stop and, if it is not a talking stop, the step 1B is again executed. If it is a talking stop, the remote record stopping data is sent at step 4B, and a step 5B is executed.

In the step 5B, a standby data is sent. The stationary unit receives the remote data in the method described for the operating data and separates the modulating signal from the transmitting frequency in step 6B. Thereafter, the second CPU 61 judges whether remote data is present in step 7B and, when there is none, executes again the step 6B. When there is remote data present, the step 8B is executed. In the step 8B, a judgment is made as to whether a remote record stopping data is present and, when it is present, executes other commanding process routine A, and when the data is not present, proceeds to a record stopping routine at step 9B.

In review of the described recording operations, if it is desired to record a conversation during talking over a phone line connection, a user presses the operating button of the portable unit. According to the operation of the operating button, the first CPU 60 of the portable unit judges whether it is during talking at step 1C and, when it is not during talking, executes a standby mode process routine. When it is during talking, the CPU 60 judges whether it is a key input and, when it is not a key input, executes other operating programs and related process routines. And if it is a key input, the CPU 60 judges whether it is a remote record key input at step 3C and, When it is not a key input, executes a pre-engaged operating process routine to each key and, when it is a remote record key, executes step 4C.

In the step 4C, the CPU 60 sets a remote recording state flag, sends the remote recording data in step 5C and executes the step 6C. In the step 6C, the CPU 60 sends the data and executes a response state process routine until after a predetermined time period. Thereafter, the CPU 60 checks whether any error has occurred in step 7C and, if an error has occurred, the CPU 60 executes a resending or error processing routine. If there is no error occurrence, the CPU 60 executes a step 8C and sends a "Pee" sound to a buzzer or speaker SPK to indicate a record starting to the user.

The second CPU 61 of the stationary unit reads out the remote data receiving buffer at step 1D as shown in FIG. 6 and executes a step 2D. In the step 2D, the CPU 61 judges whether there is data and, when there is none, executes a routine for key checking in a talking mode. When the data is detected, a step 3D is executed and the CPU 61 judges whether the data is the remote recording data. When the data is not the remote recording data, the CPU 61 executes another data process routine and, when the data is the remote recording data, a step 4D is executed.

On the other hand, when speech recording is being stopped as unneeded during a phone conversation, as shown in FIG. 7, a previously defined releasing button is pressed. According to the operation of the releasing button, the first CPU 60 judges whether the remote recording flag is set in step 1E and, when it is not set, returns. If it is set, a step 2E is executed.

In the step 2E, the CPU 60 judges whether it is a remote record stopping key input and, when it is, sends the remote record stopping data in step 3E and then executes step 6E. When the input is not a remote record stopping key input, the CPU 60 judges whether the talking is ended in step 4E and, when the talking is not ended, returns. When the talking is ended, a step 5E is executed.

In the step 5E, the CPU 60 sends the talking end standby mode data and executes a step 6E. When the stationary unit receives the talking end/standby mode switching data, a remote control recording flag is set, and a remote control recording flag is reset simultaneously with the talking mode releasing.

In the step 6E, the CPU 60 sends the data and executes a check routine. Next, in step 7E, the CPU 60 checks whether any error has occurred and, when an error has occurred, executes a resending or error process routine. When there has been no error, the CPU 60 resets the remote recording state flag in step 8E.

The second CPU 61 of the stationary unit then judges whether the remote recording flag is set in step 1F as shown in FIG. 8. When it is not set, a return is made, and, when it is set, a step 2F is executed. In the step 2F, the CPU 61 reads out the remote data receiving buffer and judges the presence or absence of data in step 3F.

When there is no data, the CPU 61 executes other operating state data programs and related process routines, and, when there is data, a step 4F is executed. In the step 4F, the CPU 61 judges whether there is remote record stopping data, and, if not, a step 5F is executed. If such data is detected, a step 7F is executed.

In the step 5F, the CPU 61 judges whether there is talking end/standby mode data and, if not, returns. When there is such data, a step 6F is executed. In the step 6F, a corresponding process routine is executed, and a step 7F is then performed. In the step 7F, the CPU 61 processes a recording operation stopping routine, and then resets the remote recording state flag in step 8F.

As described above, according to the present invention, a portable unit of a wireless telephone set can operate a base unit recorder to record a speech of an opposite party by remote-control when there is a matter needed to be recorded during a conversation and recording of unwanted speech during the conversation can be stopped, all by software actuation without any requirement for added telephone hardware. Thus, the invention enables this recording function to be achieved very cost effectively in a telephone wireless product.

An appendix attached hereto provides a detailed listing of the various elements shown in the drawings.

It will be appreciated that the present invention is not restricted to the particular embodiment that has been described hereinbefore, and that variations and modifications may be made therein without departing from the spirit and scope of the invention as defined in the appended claims.

APPENDIX

In FIG. 1

| | |
|---|---|
| 10: | First transmitting and receiving buffer section |
| 20: | First high frequency amplifying section |
| 30: | First intermediate frequency amplifying and mixing section |
| 40: | First voice amplifying section |
| 50: | First data detecting section |
| 60: | First CPU (Central Processing Unit) |
| 70: | First transmitting power amplifying section |
| 80: | First transmission modulating section |
| 90: | First signal amplifying section |
| 110: | Display section |
| 120: | Key pad section |

In FIG. 2

| | |
|---|---|
| 11: | Second transmitting and receiving buffer section |
| 21: | Second high frequency amplifying section |
| 31: | Second intermediate frequency amplifying and mixing section |
| 41: | Second voice amplifying section |
| 51: | Second data detecting section |
| 61: | Second CPU (Central Processing Unit) |
| 71: | Second transmitting power amplifying section |
| 81: | Second transmission modulating section |
| 91: | Second signal amplifying section |
| 100: | Ring signal detecting section |
| 130: | Dial section |
| 150: | Response message recording and sending section |
| 160: | Business message recording section |

In FIG. 3

START: Present talking mode

| | | | |
|---|---|---|---|
| 1A: | Is remote record key inputted? | (Yes, No) | The portable mobile set |
| 2A: | Makes the remote recording data | | |
| 3A: | Sends the data | | |
| 4A: | Read out the remote data receiving buffer | | |
| 5A: | Is any data present? | (Yes, No) | The |

APPENDIX-continued

| | | | |
|---|---|---|---|
| 6A: | Is the remote recording data present? → (A) To other command operation process routine | (Yes, No) | Stationary set |
| 7A: | Recording mode operation | | |
| 8A: | Sends the remote record starting data | | |
| 9A: | Is the remote recording started? | (Yes, No) | The portable mobile set |
| 10A: | Sends "Pee" sound | | |

In FIG. 4

| | | | |
|---|---|---|---|
| 1B: | Stops the remote recording? | (Yes, No) | |
| 2B: | Sends the remote record stopping data → RETURN | | |
| 3B: | Stops the talking? | (Yes, No) | The portable mobile set |
| 4B: | Sends the remote record stopping data (This data can be deleted in case when stopping the talking) | | |
| 5B: | Sends the standby data → RETURN | | |
| 6B: | Read out the remote data receiving buffer | | |
| 7B: | Is any data present? | (Yes, No) | The stationary set |
| 8B: | Is the remote record stopping data present? | (Yes, No) | |
| 9B: | Record stopping routine → RETURN | | |

In FIG. 5

START

| | | |
|---|---|---|
| 1C: | During talking? → to a standby mode process routine | (Yes, No) |
| 2C: | Is the key inputted? → to other operation progress and related process routine | (Yes, No) |
| 3C: | Is it the remote record key? → to the operation process key routine pre-engaged to each key | (Yes, No) |
| 4C: | Sets the remote recording state flag | |
| 5C: | Sends the remote recording data | |
| 6C: | Sends the data and checks the routine | |
| 7C: | Has any error occured? → to the re-sending or error process routine | (Yes, No) |
| 8C: | Sends "Pee" sound to the buzzer or speaker → RETURN | |

In FIG. 6

START: Executes this routine at the talking mode

| | | |
|---|---|---|
| 1D: | Reads out the remote data receiving buffer | |
| 2D: | Is any data present? → to other routine such as a key check at the talking mode | (Yes, No) |
| 3D: | Is it the remote recording data? → to other data process routine | (Yes, No) |
| 4D: | Sets recording mode operation and a flag | |
| 5D: | Sends the remote recording time data → RETURN | |

In FIG. 7

START

| | | |
|---|---|---|
| 1E: | Is the remote record flag set? | (Yes, No) → RETURN |
| 2E: | Is it the remote record stopping key? | (Yes, No) |
| 3E: | Sends the remote record stopping data | |
| 4E: | Is the talking ended? | (Yes, No) → RETURN |
| 5E: | Sends the speech end/standby mode data | |
| 6E: | Sends the data and checks the routine | |
| 7E: | Has any error occured? → to the re-sending or error process routine | (Yes, No) |
| 8E: | Resets the remote recording state flag → RETURN | |

In FIG. 8

START

| | | |
|---|---|---|
| 1F: | Is the remote record flag set? | (Yes, No) → RETURN |
| 2F: | Reads out the remote data receiving buffer | |
| 3F: | Is the data present? → to other operation state progress and related process routine | (Yes, No) |
| 4F: | Is it the remote record stopping data? | (Yes, No) |
| 5F: | Is it the speech end/standby mode data? | (Yes, No) → RETURN |
| 6F: | Processes the corresponding routine | |
| 7F: | Processes the recording operation stopping routine | |
| 8F: | Resets the remote recording state flag → RETURN | |

What is claimed is:

1. A remote recording method for a wireless telephone having mobile and base units respectively having first and second digital computers, the steps of the method comprising:

a first step for operating the first computer to judge whether a remote record key is inputted to the mobile unit by an operation button during talking, and sending to the base unit a remote record data to command a record starting if the remote recording key is inputted;

a second step for operating the second computer to set a recording mode operation in the base unit, flagging the data applied from the first computer, and acknowledging the remote record starting data to the first computer;

a third step for operating the first computer to judge whether a remote recording stopping key is inputted to the mobile unit by a release button during talking and sending the remote record stopping data to the second computer if the record stopping key is inputted; and a fourth step for operating the second computer to respond to the remote record stopping data and resetting the remote recording state flag.

2. The remote recording method of claim 1, wherein the first operating step comprises:

judging whether the mobile unit is in a talking state and whether a remote recording key is inputted;

setting a remote recording state flag when a record key is inputted and sending the remote record data to the base unit; and using a check routine to judge whether any error has occurred and, enabling the record starting, if an error has not occured.

3. The remote recording method of claim 1, wherein the second operating step comprises:

reading out a remote data receiving buffer and judging whether the resultant reading is a remote record data; and setting a record mode operation and a corresponding flag when the reading is a remote record data, and sending the remote record starting data to the base unit for execution by the second computer.

4. The remote recording method of claim 1, wherein the third operating step comprises:

judging whether a remote record flag is set and a remote record stopping key is inputted;

sending the remote record stopping data to the base unit when the remote record stopping key is input, and, when there has been no error, resetting a remote recording state flag; and judging whether speech is ended when there has been no remote record stopping key input and, when speech is ended, sending speech end/standby mode data to the base unit for execution by the second computer and resetting the remote recording state flag.

5. The remote recording method of claim 1, wherein the fourth operating step comprises:

judging whether a remote record flag is set, and, when the remote record flag is set, reading out the remote data receiving buffer, and judging whether the readout is the remote record stopping data;

resetting a remote recording state flag when the remote record stopping data is read out; and when the readout is not the remote record stopping data, judging whether the readout is the speech end/standby mode data, and, if so, processing a corresponding routine, and resetting the remote recording state flag.

6. A system for remote audio recording in a wireless telephone having a base unit and a mobile unit, the system comprising:

a first digital computer for the mobile unit;

a second digital computer for the base unit;

means including the first computer for detecting whether a remote record key is inputted to the mobile unit by an operation button during talking and, if the remote record key is inputted, sending to the base unit a remote record data to command a record starting;

means including the second computer for setting a recording mode operating in the base unit, flagging the data applied from the first computer, and acknowledging the remote record starting data to the first computer;

means including the first computer for detecting whether a remote record stopping key is inputted to the mobile unit by a release button during talking and, if the record stopping key is inputted, for sending the remote record stopping data to the second computer; and means including the second computer for responding to the remote record stopping data and resetting a remote recording state flag.

* * * * *